United States Patent [19]

McArdle et al.

[11] Patent Number: 4,629,475
[45] Date of Patent: Dec. 16, 1986

[54] LIQUID DEBUBBLING APPARATUS AND METHOD

[75] Inventors: Donald J. McArdle, Belmont; Robert H. Russell, Framingham Centre, both of Mass.; Donald G. Scott, Derry, N.H.

[73] Assignee: Polaroid Corporation, Cambridge, Mass.

[21] Appl. No.: 326,583

[22] Filed: Dec. 2, 1981

Related U.S. Application Data

[63] Continuation of Ser. No. 149,465, May 13, 1980, abandoned, which is a continuation-in-part of Ser. No. 124,760, Feb. 26, 1980, abandoned, which is a continuation of Ser. No. 969,983, Dec. 15, 1978, abandoned.

[51] Int. Cl.$^4$ ............................................. B01D 19/00
[52] U.S. Cl. ......................................... 55/52; 55/178; 55/193; 55/201
[58] Field of Search ....................... 210/436, 472, 188; 55/178, 201, 193, 44, 159, 52, 179, 190, 192

[56] References Cited

U.S. PATENT DOCUMENTS 3,545,937 12/1970 Rozhold et al. .................. 55/178 X
3,827,561  8/1974 Serfass et al. ................... 210/436 X
3,849,071 11/1974 Kayser ........................... 128/DIG. 3

FOREIGN PATENT DOCUMENTS 390448 2/1924 Fed. Rep. of Germany ........ 55/201
573170 9/1977 U.S.S.R. .............................. 55/193

Primary Examiner—Frank Spear
Attorney, Agent, or Firm—John J. Kelleher

[57] ABSTRACT

Constant volume and therefore constant flow rate apparatus is provided for removing bubbles of gas from a process liquid that is used in the manufacture of a product where the presence of such bubbles has a detrimental effect on the quality of the finished product. Gas bubbles are removed from a liquid by passing the liquid through a bubble coalescing baffle, in a generally upward direction, and into a chamber situated directly above the baffle, the chamber having an upward sloping upper surface, and a gas vent at the upper portion thereof, that is laterally displaced a substantial distance in the direction of liquid flow from the center of upward liquid flow, for the purpose of continuously venting gas bubbles that have separated from the liquid without allowing a significant volume of gas to accumulate in the chamber and without allowing the liquid to exit through the gas vent. The flow rate of liquid passing through the apparatus remains substantially constant primarily because the separated gas is vented before it can displace the liquid to any significant degree. After exiting from the baffle, the direction of the moving liquid is substantially reversed with respect to its generally upward direction through the baffle, before being permitted to pass out of the bubble removing apparatus, to thereby take advantage of the buoyancy forces on the rising coalesced bubbles for enhanced process liquid/gas bubble separation.

10 Claims, 3 Drawing Figures

LIQUID DEBUBBLING APPARATUS AND METHOD

CROSS-REFERENCE TO RELATED APPLICATIONS

This is a continuation of application Ser. No. 149,465, filed May 13, 1980 now abandoned, which is a continuation-in-part of application Ser. No. 124,760 filed Feb. 26, 1980 (now abandoned) which is in turn a continuation of application Ser. No. 969,983, filed on Dec. 15, 1978 (now abandoned).

BACKGROUND OF THE INVENTION

1. Field of the Invention

The present invention relates to apparatus for removing bubbles of gas from a liquid in general, and to apparatus for removing such gas from a process liquid, in particular.

2. Description of the Prior Art

The presence of gas bubbles in a liquid often produces a number of thermal, optical, flow, etc. problems in a variety of situations and/or industries. In the photographic industry, for example, the presence of bubbles whose size equal or exceed the range of bubble sizes between 20-100 microns in certain photographic film coatings reduces film quality to an unacceptable level by causing spots to appear in the finished photographic print. An excessive number of bubbles in such coatings will result in increased film production costs due to the attendant loss in production of acceptable quality film.

Previous attempts at removing bubbles of gas from a liquid have met with varying degrees of success. In U.S. Pat. No. 3,775,947 to DUPONT, et al., gas bubbles are removed from the cooling liquid of an internal combustion engine by passing the liquid through a mass of material or baffle such as synthetic foam, synthetic fibres or the like, in a generally horizontal direction, to reduce the velocity of gas bubbles within the liquid so that the bubbles have time to rise to an overhead venting chamber, and then directing the cooling liquid downward upon exiting from the baffle. While this particular gas bubble removing apparatus may be effective for removing relatively large millimeter size gas bubbles from a flowing liquid, a size suggested by the cavity size of the baffle material recited in the DUPONT, et al. patent, such an arrangement is relatively ineffective for removing relatively small, product quality reducing, micron size gas bubbles from a process liquid due, in part, to the fact that the liquid flow rate near the vent of the gas bubble removing apparatus is not slow enough to allow time for the small bubbles to rise to the gas bubble vent.

In U.S. Pat. No. 2,823,804 to MYRING, air bubbles, as well as other impurities, are removed from petroleum distillates by passing the distillate through a filter in a generally horizontal direction and then directing the distillate downward, as buoyancy forces move the air bubbles upward into an air venting chamber. This arrangement may be effective for removing a sufficient quantity of air bubbles from a petroleum distillate so that it can be used for some particular purpose, but many of the smaller air bubbles passing through the filter would also move downward with the filtered liquid because of the ineffectiveness of the buoyancy forces to prevent such movement, which would make liquid that had been filtered in this manner having the so retained air bubbles unacceptable as a process liquid in many process liquid applications.

Other gas bubble removing prior art devices have disadvantages similar to those mentioned above in that either they are incapable of removing bubbles that are smaller than a certain bubble size, or they are inefficient at removing bubbles having a bubble size that is unacceptable when contained in a process liquid. In addition, some prior art gas bubble removing apparatus introduce unacceptable changes in the volume or flow rate of liquid passing through the apparatus during the gas bubble removal process. Volume or flow rate changes can cause premature release of trapped small diameter bubbles that remain in the flow stream and may have a deleterious effect on a finished product utilizing liquid from the flow stream.

SUMMARY OF THE INVENTION

In accordance with the teachings of the present invention, relatively constant flow gas removal apparatus is provided for effectively removing bubbles of gas from a liquid having a bubble diameter in the range of 20-100 microns. The liquid is passed through a bubble coalescing baffle, in a generally upward direction for the purpose of increasing bubble size and buoyancy in order to facilitate subsequent bubble removal. The liquid is then directed into an overhead chamber having an upward sloping upper surface, and a gas vent at the upper portion thereof that is displaced a substantial lateral distance in the said direction of liquid flow into said chamber wherein gas rising to the top of said chambers is continually vented. The volume of liquid passing through said apparatus remains substantially constant primarily because the separated gas is vented before it can displace liquid contained in the overhead chamber to any significant degree. Once the liquid enters said overhead chamber in a generally upward direction, its direction of flow is substantially reversed with respect to its generally upward direction of movement through said baffle in order to take advantage of the buoyancy forces on the rising coalesced bubbles to enhance liquid/gas bubble separation, before the liquid is permitted to pass out of said gas bubble removing apparatus.

DESCRIPTION OF THE PREFERRED EMBODIMENTS

Figure 1:
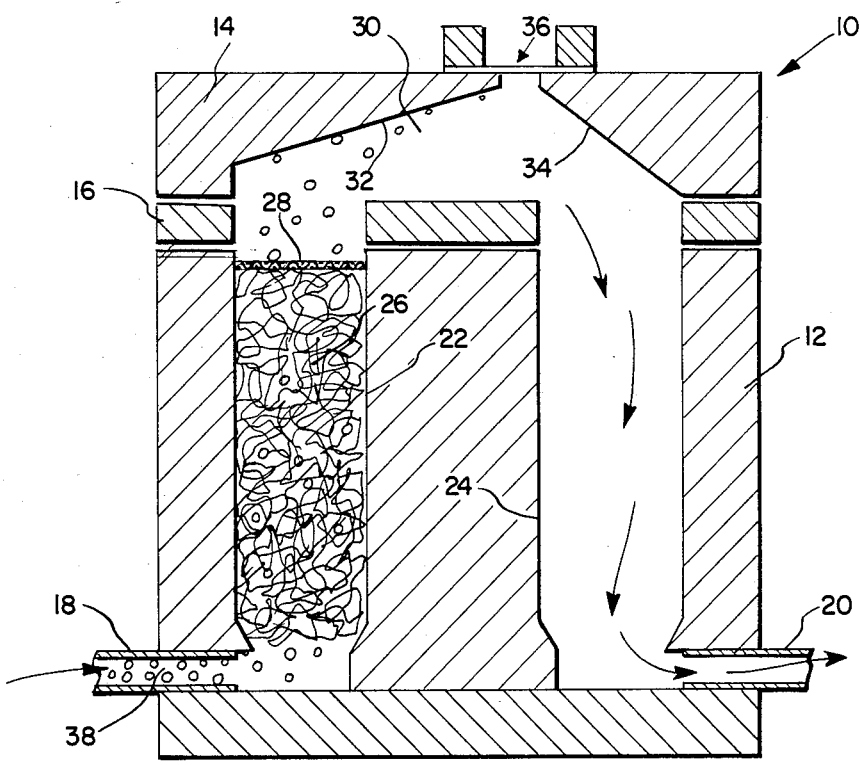
FIG. 1 is a front elevational view of a single bubble coalescing bin device having an overhead chamber with an upward sloping upper surface and a gas vent for removing bubbles of gas from a liquid that embodies the inventive concept of the present invention.

Referring now to the drawings and, specifically, to FIG. 1, an elevational view of apparatus for removing bubbles of gas from a liquid embodying the inventive concept of the present invention, is depicted. This gas bubble removing apparatus includes housing 10 having base member 12, cover member 14, and gasket 16 interposed between cover 14 and housing base 12 to provide a fluid-tight interface between these two members. Housing base 12 includes inlet conduit 18 and outlet conduit 20 near the bottom of said base 12. Housing base 12 also includes bubble bin 22 and outlet bin 24. Homogeneous mass of material or baffle 26 having a tridimensional reticulated structure is uniformly distributed within bubble bin 22. Screen 28 is positioned at the top of bubble bin 22 and at the top of baffle 26 to trap baffle 26 within bubble bin 22. Cover member 14 includes bubble chamber 30 having upward sloping surfaces 32, 34 at the upper portion thereof and conventional venting means 36 at the top of chamber 30 to continuously vent gas rising to the top of said chamber 30. Venting means 36 is offset a substantial distance from the center of bubble bin 22 which, in this embodiment, is the center of upward liquid flow into said chamber 30 from bubble bin 22.

In operation, liquid 38 containing bubbles of gas enters the bottom of housing 10 through inlet conduit 18 at the bottom of housing base 12 and then moves through bubble bin 22 and mass of material or baffle 26 that is trapped within bubble bin 22. Mass of material 26 has been characterized as a baffle because it slows the forward progress of liquid 38 and the gas bubbles moving within said liquid 38. Baffle 26 is preferably a polyester fiber, but any fibrous or filament material, whether synthetic, natural or metallic, that is compatible with liquid 38 having a structure that forms a multiplicity of sinuous throughway passages extending in substantially all directions where none of the passages constitute a preferential passage can also be utilized. Liquid 38 passes through baffle 26 in many directions, but the general direction of liquid 38 is upward. As liquid 38 passes upward through baffle 26, the upward movement of certain gas bubbles moving within liquid 38 is temporarily arrested at the point where the size of such bubbles is greater than the openings through the sinuous passageways in the polyester fiber or baffle 26, and the buoyant and/or inertial forces associated with the arrested bubbles is not enough to move the arrested bubbles through the baffle 26 openings. Material or baffle 26 also acts to hold (store) many bubbles within itself, bubbles that have and maintain so little buoyancy that they are unable to rise to the top of said baffle 26. Such bubbles would, in effect, also be removed from liquid passing through housing 10.

The motion of gas bubbles moving within liquid 38 that enter baffle 26 and are within a certain range of bubble sizes will have their movement arrested by baffle 26 for reasons that were previously discussed. Gas bubbles that are smaller than said range of bubble sizes will pass completely through baffle 26 and bubble bin 22 without having their motion arrested, while bubbles that are larger than said range of bubble sizes will eventually force their way completely through baffle 26 due to the larger buoyant force attendant such bubbles. Bubbles having a size that is within the range of bubble sizes that are unable to pass completely through bubble bin 22 remain within gas bubble containing liquid 38 in a relatively fixed position with respect to baffle 26. As additional quantities of gas bubble containing liquid 38 subsequently enter bubble bin 22 and baffle 26, the probability that these subsequently entering bubbles will impinge upon or collide with the previously arrested or trapped bubbles is quite high. When such a collision occurs between two bubbles, the two colliding bubbles will coalesce to form a single larger bubble having a greater buoyant force than either of these two bubbles had separately. If the increase in buoyant force that is added to the trapped or arrested bubble by the subsequently impinging bubble is sufficient, the arrested bubble will be able to force its way through baffle 26 and bubble bin 22. If, on the other hand, the buoyant force of the resultant coalesced bubble is insufficient to enable the coalesced bubble to force its way through baffle 26 and bubble bin 22, the coalesced bubble waits until one or more subsequent bubbles repeat this coalescing process with respect to this previously coalesced bubble. This previously coalesced bubble remains in its arrested state until it is ultimately able to force its way completely through baffle 26.

Liquid flow through the bubble removing apparatus of FIG. 1 is in the low or laminar flow region which is due, in part, to flow restricting baffle 26 in bubble bin 22 which limits the maximum liquid flow rates through said apparatus. It is well-known that in laminar flow through a closed conduit, flow rates are higher in the center region of flow than they are at the outer flow region near the conduit surface. It is also well-known that where a liquid flows into and out of a conduit at the same rate through inlet and outlet openings having the same size, flow rates between said inlet and outlet openings decrease where there is an increase in conduit cross-section.

As shown in FIG. 1, the depth and cross-section of bubble chamber 30 increases in the direction of liquid 38 flow between bubble bin 22 and venting means 36 which causes a decrease in the flow rate of liquid 38 as it moves from bubble bin 22 towards said venting means 36. By reducing the liquid 38 flow rates in this portion of the flow path, bubbles of gas rising from bubble bin 22 will have more time to reach venting means 36 before they can be swept past said venting means 36 by the momentum of moving liquid 38. In addition, as bubbles of gas rise from bubble bin 22 towards venting means 36, they enter a series of lamina in laminar flow liquid 38 that have progressively lower flow rates, which also increases the amount of time that a rising bubble has to reach venting means 36 before passing into outlet bin 24.

Venting means 36 continuously vents gas rising to the top of liquid 38 filled bubble chamber 30. The rate of venting of gas passing through venting means 36 is such that no significant volumes of gas are able to accumulate at the top of chamber 30. If gas was allowed to accumulate at the top of chamber 30, it would displace liquid 38 as it accumulated which would, in turn, cause a change in the flow rate of liquid 38 flowing through the gas bubble removing apparatus. However, because of the continuous venting provided by venting means 36, the gas bubble removing apparatus of the present invention is a substantially constant flow rate device.

The liquid exiting from bubble bin 22 has its direction reversed within chamber 30 in cover member 14 and is then directed downward through outlet bin 24 in direction that is substantially reversed with respect to the generally upward direction of liquid 38 through bubble bin 22. Liquid 38 then exits from housing 10 through outlet conduit 20. Gas bubbles that are within the particular range of bubble sizes whose motion is arrested by bubble bin 22 and have coalesced with another bubble or bubbles, have increased in both size and buoyant force by the time they exit from bubble bin 22 and baffle 26. The increase in the buoyant force of the bubbles exiting from bubble bin 22 tends to continue these bubbles in the same generally upward direction that characterized the general direction of fluid 38 movement through bubble bin 22, while the remaining or debubbled liquid 38 moves through chamber 30, bin 24 and outlet 20 as previously discussed. The combination of the increased buoyant force of the bubbles exiting from bubble bin 22, the reversal in direction of the upward moving liquid exiting from said bubble bin 22, and a slower flow rate due to increased conduit size, results in significantly enhanced movement of these bubbles to the top of bubble chamber 30 and out of liquid 38 for venting the liberated gas outside of apparatus 10 through conventional venting means 36 and, in the ultimate gas bubble removal from, or the debubbling of, gas bubble containing liquid 38. With the exception of those extremely small bubbles mentioned above having a size that is small enough to pass completely through baffle 26 and bubble bin 22 without having their motion arrested, liquid entering outlet bin 24 and exiting from outlet conduit 22 will be free of bubbles as small as 20 microns, said exiting bubble-free liquid being of a quality suitable for certain photographic coatings that, for example, are applied to film in the photographic industry.

Venting means 36 may include either a hydrophobic or a hydrophilic venting membrane, but a hydrophobic venting membrane was found to be significantly more effective. Upward sloping surfaces 32, 34 eliminate the possibility of significant amounts of gas becoming trapped against cover 14 such that said gas is unable to reach venting means 36.

For optimum coalescing of the gas bubbles in liquid 38, mass of material or baffle 26 should have a uniform density or be uniformly distributed throughout bubble bin 22. The particular baffle material density is largely determined by the viscosity of liquid 38 and the amount of liquid 38 pressure head loss that is desired and/or can be tolerated. The baffle material is primarily intended to act as a gas bubble coalescer and is not intended to act as a filter even though it may tend to function as a filter to a relatively minor degree. Rather, the baffle material is packed relatively loose so as to provide the necessary bubble coalescing action. When relatively large volumes of a gas bubble containing liquid are required, the capacity of bubble bin 22 and the amount of baffle material 26 in bubble bin 22 must be increased in order to accommodate such increased capacity and to avoid an excessive loss of pressure within bubble bin 22. When the size of bubble bin 22 is increased, it is extremely difficult to maintain the desired uniform baffle material density throughout bubble bin 22. This problem can be avoided by constructing gas bubble removing apparatus with a plurality of relatively smaller bubble bins whose total volume is equal to the required bubble bin volume. Gas bubble removing apparatus having a plurality of bubble bins and having a baffle material uniformly distributed throughout each of said bubble bins, is depicted in FIG. 2.

Figure 2:
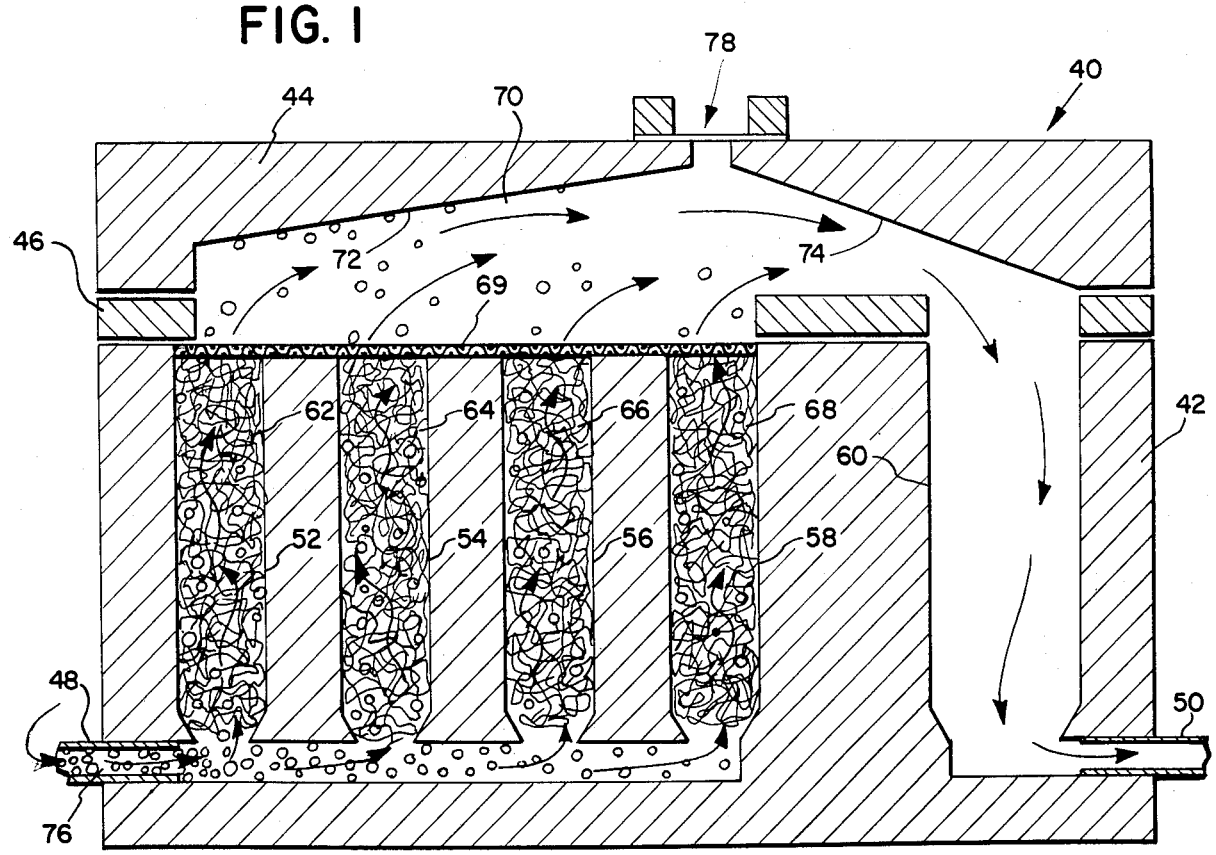
FIG. 2 is a front elevational view of a relatively large capacity device for removing bubbles of gas from a liquid incorporating a plurality of bins of the type depicted in FIG. 1.

In FIG. 2, liquid debubbling apparatus having a plurality of bubble bins for removing gas bubbles from relatively large quantities of a liquid, is depicted. The multi-bin gas bubble removing apparatus includes housing 40 having base member 42, cover 44, and gasket 46 interposed between cover 44 and housing base 42 to provide a fluid-tight interface between these two members. Housing base 42 includes inlet conduit 48 and outlet conduit 50 near the bottom of base 42. Housing base 42 also includes a plurality of bubble bins 52, 54, 56 and 58, and outlet bin 60. Baffles 62, 64, 66 and 68, having the same characteristics as baffle 26 in FIG. 1, are uniformly distributed throughout bubble bins 52, 54, 56 and 58, respectively. Screen 69 is positioned at the top of bubble bins 52, 54, 56 and 58 and at the top of baffles 62, 64, 66, and 68 to trap said baffles within their respective bubble bins. Cover member 44 includes bubble chamber 70 having upward sloping surfaces 72, 74 at the upper portion thereof and conventional venting means at the top of chamber 70 for venting gas rising to the top of chamber 70.

Gas bubble containing liquid 76 enters the bottom of housing 40 through inlet conduit 48 at the bottom of housing base 42, flows into parallel bubble bins 52, 54, 56 and 58 and then flows through parallel masses of material or baffles 62, 64, 66 and 68 contained, respectively, within said bins. Gas bubble containing liquid 76 passes through bubble bins 52, 54, 56 and 58 and the baffle material contained therein in the same general manner and direction that liquid 38 in FIG. 1 passes through bubble bin 22. Bubbles exiting from bubble bins 52, 54, 56 and 58 whose motion has been arrested by baffles contained in the these bubble bins and who have gone through the coalescing process mentioned above with respect to FIG. 1, will have increased in size with an attendant increase in buoyant force.

As in the apparatus of FIG. 1, the depth and cross-section of bubble chamber 70 increases in the direction of liquid 76 flow between the collective center of bubble bins 52, 54, 56 and 58, and venting means 78 which causes a decrease in the flow rate of liquid 76 as it moves from said bubble bins toward said venting means 78. The advantages of increasing the depth of bubble chamber 70 in this manner are the same as those obtained by increasing the depth of bubble chamber 30 in FIG. 1.

The liquid exiting from bubble bins 52, 54, 56 and 58 has its direction reversed within chamber 70 in cover member 44 and is then directed downward through outlet bin 60 in a direction that is substantially reversed with respect to the generally upward direction of liquid 76 through bubble bins 52, 54, 56 and 58, and then exits from outlet bin 60 and housing 40 through outlet conduit 50. The increase in the buoyant force of the bubbles exiting from bubble bins 52, 54, 56 and 58 tends to continue these bubbles in the same vertically upward direction that characterized the general movement of liquid 76 through these bubble bins. Coalesced bubbles exiting from bubble bins 52, 54, 56 and 58 move to the top of bubble chamber 70 for venting through conventional venting means 78, while liquid 76, now bubble-free as defined herein, moves through the remainder of chamber 70, outlet bin 60 and then outlet conduit 50. As in the debubbling apparatus of FIG. 1, upward sloping surfaces 72, 74 of cover member 44 in FIG. 2 eliminate the possibility of significant amounts of gas becoming trapped against cover member 44 such that said gas would be unable to reach venting means 78. The debubbling apparatus in FIG. 2 removes gas bubbles from a liquid to the same extent that the debubbling apparatus depicted in FIG. 1 removes gas bubbles from the same liquid. However, with the larger number of bubble bins in the debubbling apparatus of FIG. 2, the apparatus of FIG. 2 has a substantially greater liquid debubbling capacity than the liquid debubbling apparatus depicted in FIG. 1.

Figure 3:
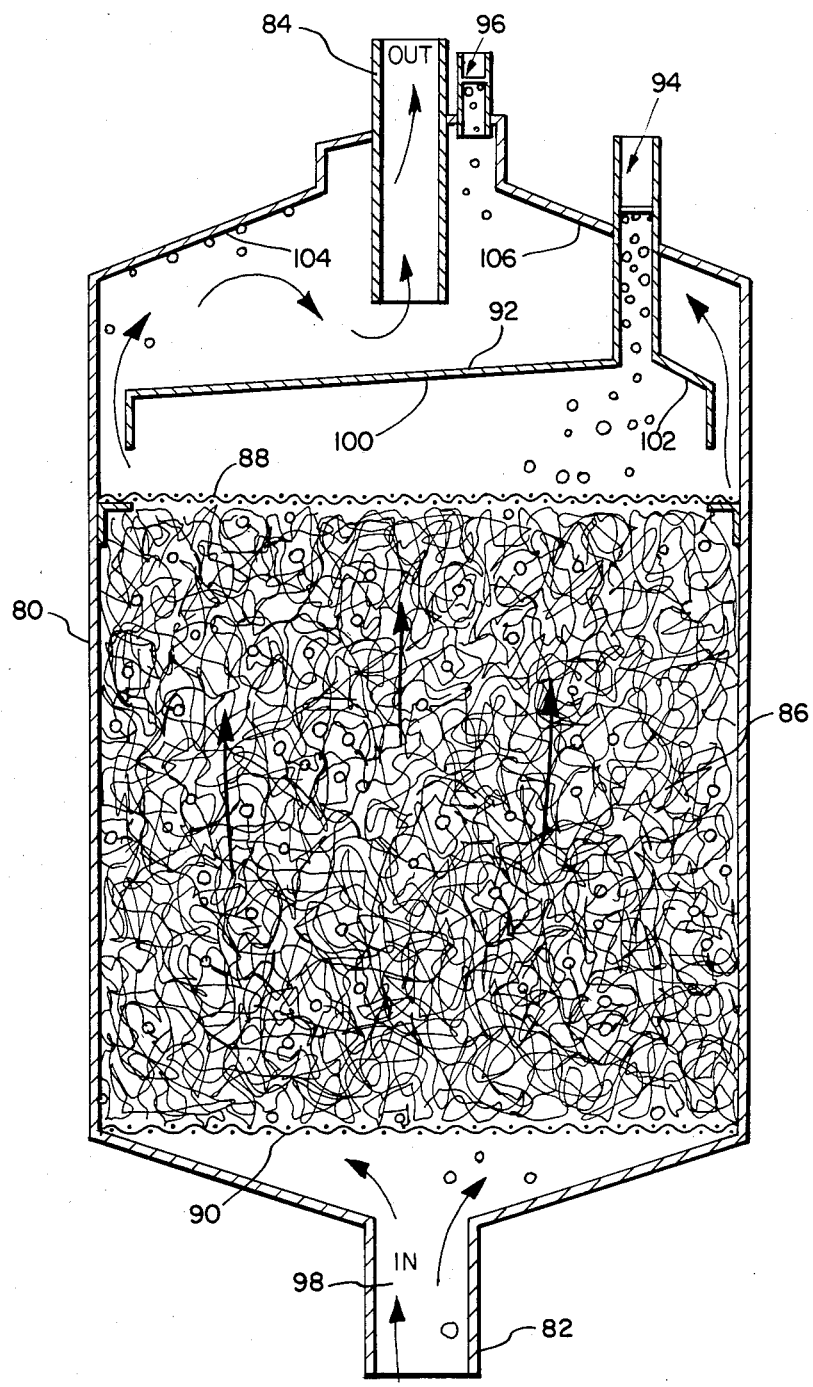
FIG. 3 is a front elevational view of an alternate embodiment of a device for removing bubbles of gas from a liquid in which the liquid is diverted to the outer extremes of the device before having its direction reversed for enhanced liquid/gas bubble separation.

An alternate arrangement incorporating the inventive concept embodied in the gas bubble removing apparatus of FIGS. 1 and 2 is also incorporated in the liquid debubbling apparatus depicted in FIG. 3. Apparatus for removing bubbles of gas from a liquid illustrated in FIG. 3 includes enclosed cylindrical liquid-tight housing 80 of generally circular cross section having enclosed upper and lower end portions and having inlet conduit 82 projecting through the lower end portion of housing 80, and outlet conduit 84 projecting through the upper end portion of housing 80. Mass of material or baffle 86 is uniformly distributed within housing 80 and is confined within upper baffle retaining screen 88, lower retaining screen 90 and the wall of cylindrical housing 80, baffle 86 retaining screens having their peripheries mounted in a fixed relation with respect to the wall of housing 80. Inverted funnel 92 having first conventional venting means 94 projecting through the upper end portion of housing 80 is centrally mounted above upper baffle retaining screen 88 in a fixed position with respect to housing 80. In addition to first conventional venting means 94 projecting through the upper end portion of housing 80, second conventional venting means 96 also projects through the upper end portion of housing 80 but at a more elevated position in said housing end portion than first conventional venting means 94.

Gas bubble containing liquid 98 enters conduit 82, passes through lower baffle retaining screen 90 and then gas bubble coalescing mass of material or baffle 86 in a generally upward direction. Baffle 86 has the same characteristics and is constructed of the same material(s) as baffle 26 in the bubble removing apparatus of FIG. 1. As in baffle 26 of FIG. 1, bubbles within a particular range of sizes will have increased in size and buoyant force upon exiting from the top of baffle 86 and upper baffle retaining screen 88 as a result of the coalescing action or process caused by baffle 86. Most of the bubbles exiting from baffle 86 will be captured by inverted funnel 92 and will migrate up sloping surfaces 100, 102 of funnel 92 for venting through first conventional venting means 94 at the top of gas bubble collecting and venting inverted funnel 92. Liquid 98 and those gas bubbles within liquid 98 that are not captured by funnel 92 flow around the periphery of funnel 92 and to the top of the upper end portion of housing 80 for venting through second conventional venting means 96. Sloping surfaces 104, 106 in the upper end portion of housing 80 facilitate the migration of gas bubbles to venting means 96.

As in the apparatus of FIGS. 1 and 2, the depth of the space between inverted funnel 92 and sloping surfaces 102 and 106 increases between the opening where liquid 98 flows around inverted funnel 92 and venting means 96, which causes a decrease in the flow rate of liquid 98 as it moves between funnel 92 and sloping surfaces 102 and 106. The advantages of increasing the depth of the space between funnel 92 and sloping surfaces 102 and 106 in this manner are the same as those obtained by increasing the depth of chambers 30 and 70 in FIGS. 1 and 2, respectively.

As liquid 98 nears the top of the upper end portion of housing 80, its direction of flow is substantially reversed with respect to the generally upward direction of liquid 98 through baffle 86. This reversal of liquid 98 while the coalesced bubbles with their increased buoyant force are moving generally upward substantially enhances the removal of gas bubbles from liquid 98. Once the reversal of flowing liquid 98 is complete, liquid 98 is gas bubble free as defined herein with respect to the apparatus of FIGS. 1 and 2, and the direction of bubble-free liquid is again reversed for movement out of housing 80 through outlet conduit 84. Liquid exiting from outlet conduit 84 would then be routed to a particular use point where, as in the case of certain photographic coatings in the photographic industry, for example, it would be applied to a particular photographic film.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Constant flow apparatus for removing bubbles of gas from a liquid that substantially fills the interior thereof, comprising:

a liquid inlet;

a liquid outlet;

a baffle communicating with said inlet, said baffle comprising a material adapted to increase the size of gas bubbles carried by said liquid as said liquid and gas bubbles pass therethrough, said baffle configured to facilitate the passage of liquid therethrough at a given velocity;

a gas bubble vent;

means for defining a chamber above said baffle communicating with said gas bubble vent, said chamber being configured to reduce the velocity of flow of said liquid below said given velocity as it passes from said baffle in the direction of said vent facilitating the further increase in size of said bubbles and their upward movement into contact with the upper interior surface of said chamber, said upper interior surface of said chamber being configured to guide gas bubbles accumulating thereon into contact with said vent for the continual venting thereof; and means for effecting a downward directional movement of said liquid within said chamber in the vicinity of said gas bubble vent as it flows toward said outlet to facilitate its separation from the gas bubbles moving upward within said chamber towards said gas bubble vent.

2. The apparatus of claim 1 wherein said chamber is configured such that said flow of said liquid as it enters said chamber is generally laterally displaced from said vent.

3. The apparatus of claim 2 wherein said chamber widens as said flow proceeds toward said laterally displaced vent to thereby reduce the velocity of flow of said liquid.

4. The apparatus of claim 2 wherein said chamber includes a plate member located over said baffle, said plate member deflecting said fluid flow to the edges thereof, and said vent is located over said plate at the uppermost part of said chamber such that the flow of fluid around said plate is laterally displaced from said vent.

5. The apparatus of claim 4 wherein said liquid outlet extends downwardly from an uppermost portion of said chamber toward said plate for effecting said downward directional movement of said liquid.

6. The apparatus of claim 1 wherein a portion of said chamber slopes upwardly from said baffle to said vent.

7. The apparatus of claim 1 wherein the position of at least a portion of said outlet is at a lower height than the maximum height of said baffle so as to effect said downward directional movement of said liquid.

8. The apparatus of claim 1 wherein a portion of the interior of said apparatus is subdivided into a plurality of bins, with each of said bins containing a portion of said baffle through which liquid introduced into said apparatus will flow in a generally upward direction toward the top of said chamber.

9. The apparatus of claim 1 wherein said gas bubble vent includes a hydrophobic venting membrane.

10. A method of removing bubbles of gas from a liquid in a hollow housing having an inlet, an outlet, a gas vent projecting through said housing, bubble coalescing baffle structure and a cavity portion internal of said housing located above said baffle between said gas vent and said baffle structure, said method comprising:

locating said vent in said housing in a position that is laterally displaced downstream from the direction of liquid flow at the highest point of said cavity portion;

introducing said liquid into said inlet;

directing said liquid in a generally upward direction through said bubble coalescing baffle structure such that at least a portion of said liquid contact said gas vent;

venting coalesced bubbles rising from said baffle stucture through said gas vent;

substantially reversing the generally upward direction of said liquid with its generally upward moving, coalesced, increased buoyancy bubbles after said liquid exits from said baffle structure to thereby enhance gas bubble/liquid separation; and directing said liquid, whose direction has been reversed, out through said outlet.

* * * * *